(12) United States Patent
Murakami et al.

(10) Patent No.: US 9,638,254 B2
(45) Date of Patent: May 2, 2017

(54) ROLLING BEARING

(71) Applicant: MINEBEA CO., LTD., Kitasaku-gun, Nagano (JP)

(72) Inventors: Tatsuhiko Murakami, Kitasaku-gun (JP); Shingo Ozaki, Komoro (JP)

(73) Assignee: MINEBEA CO., LTD, Kitasaku-gun (JP)

( * ) Notice: Subject to any disclaimer, the term of this patent is extended or adjusted under 35 U.S.C. 154(b) by 0 days.

(21) Appl. No.: 15/086,365

(22) Filed: Mar. 31, 2016

(65) Prior Publication Data

US 2016/0290401 A1    Oct. 6, 2016

(30) Foreign Application Priority Data

Mar. 31, 2015   (JP) .................. 2015-071042

(51) Int. Cl.
   *F16C 33/78*   (2006.01)
   *F16C 33/66*   (2006.01)
   (Continued)

(52) U.S. Cl.
   CPC ........ *F16C 33/7879* (2013.01); *F16C 23/086* (2013.01); *F16C 33/36* (2013.01);
   (Continued)

(58) Field of Classification Search
   CPC .... F16C 33/7879; F16C 33/086; F16C 33/36; F16C 33/366; F16C 33/605;
   (Continued)

(56) References Cited

U.S. PATENT DOCUMENTS 2,584,227 A    2/1952   Potter
2,967,743 A  * 1/1961   Howe, Jr. ........... F16C 33/7853
                                                    277/565

(Continued)

FOREIGN PATENT DOCUMENTS

DE       3906656 A1    9/1989
GB        622418 A  *  5/1949  ........... F16C 33/784
JP     2004-508511 A   3/2004

OTHER PUBLICATIONS

Sep. 1, 2016 Search Report issued in European Patent Application No. 16163225.2.

Primary Examiner — Thomas R. Hannon
(74) Attorney, Agent, or Firm — Oliff PLC (57) ABSTRACT

There is provided a rolling bearing including: inner and outer members, rolling elements in a raceway space, flexible annular sealing members which close openings at both ends of the raceway space, and annular metal shield members. Each sealing member is formed in three-dimensional shape such that the sealing member in a natural state is convex inwardly between outer and inner circumferential edge portions and the inner circumferential edge portion is elastically in surface contact with the outer surface of the inner member when the sealing member is fitted to the outer member. Each metal shield member is fixed to the outer member in a state that the outer circumferential edge portion of each sealing member is sandwiched between the metal shield member and the outer member. Each metal shield member covers part of each sealing member without contacting the inner member.

15 Claims, 3 Drawing Sheets

(51) Int. Cl.
  *F16C 23/08* (2006.01)
  *F16C 33/36* (2006.01)
  *F16C 33/60* (2006.01)
  *F16C 19/38* (2006.01)

(52) U.S. Cl.
  CPC .......... *F16C 33/366* (2013.01); *F16C 33/605* (2013.01); *F16C 33/6659* (2013.01); *F16C 33/783* (2013.01); *F16C 33/7806* (2013.01); *F16C 33/7826* (2013.01); *F16C 33/7859* (2013.01); *F16C 33/7896* (2013.01); *F16C 19/386* (2013.01); *F16C 23/084* (2013.01)

(58) Field of Classification Search
  CPC .............. F16C 33/6659; F16C 33/7806; F16C 33/7826; F16C 33/783; F16C 33/7859; F16C 33/7896
  See application file for complete search history.

(56) References Cited

U.S. PATENT DOCUMENTS

| | | | | |
|---|---|---|---|---|
| 3,071,385 | A * | 1/1963 | Greiner | F16C 33/7856 277/371 |
| 3,162,456 | A * | 12/1964 | Williams | F16J 15/3248 277/551 |
| 3,226,168 | A | 12/1965 | Recknagel | |
| 4,566,811 | A * | 1/1986 | Lundgren | F16C 23/086 384/147 |
| 5,232,292 | A * | 8/1993 | Stackling | F16C 33/7806 277/375 |
| 5,685,650 | A * | 11/1997 | Martinie | F16C 35/073 384/538 |
| 6,394,656 | B1 * | 5/2002 | Williams | F16C 19/38 384/450 |
| 8,061,903 | B2 * | 11/2011 | Kolar | F16C 23/086 384/484 |
| 8,740,464 | B2 * | 6/2014 | Berns | F16C 33/7806 277/579 |
| 2015/0336658 | A1 * | 11/2015 | Habibvand | B64C 9/16 244/213 |

* cited by examiner

ROLLING BEARING

CROSS REFERENCE TO RELATED APPLICATION

The present application claims priority from Japanese Patent Application No. 2015-071042 filed on Mar. 31, 2015, and titled "ROLLING BEARING", the disclosures of which is incorporated herein by reference in its entirety.

BACKGROUND

The present disclosure relates to rolling bearings whose inner member and outer member are rotatable relative to each other via rolling elements such as rollers or the like.

A rolling bearing in which a plurality of rolling elements such as balls or rollers are contained in a raceway space between an inner race (or inner ring) and an outer race (or outer ring) and in which the inner ring and the outer ring rotate relative to each other by means of the rolling motion of the rolling elements, are used in various devices and mechanical products. If contaminants such as dusts and the like enter into the raceway space of such kind of rolling bearing, then the rolling bearing is affected in terms of its performance and/or operating life. Therefore, such kinds of rolling bearing is provided with sealing means to close openings defined between one ends of the inner and outer rings and the other ends of the inner and outer rings. For example, Japanese Translation of PCT International Application Publication No. 2004-508511 discloses a sealing means in which a circular sealing member having an inner circumferential edge portion which contacts the inner ring, is fixed to a circular shield member fixed on the outer ring. This sealing member also has a function of retaining, inside the raceway space, a lubricant such as grease or the like filled in the raceway space of such a rolling bearing.

SUMMARY

The annular sealing member in contact with the inner ring as described in Japanese Translation of PCT International Application Publication No. 2004-508511 is planar. Therefore, the inner circumferential edge portion may curl inwardly and enter into the raceway space. If the inner circumferential edge portion enters into the raceway space, then the effect of sealing the raceway space decreases, thereby making it easier for contaminants to enter into the raceway space. Further, such a problem may also arise that the rotary torque increases to affect a smooth rotation.

The present disclosure is made in view of the above problems, and an object thereof is to provide a rolling bearing capable of effectively preventing contaminants from entering into the raceway space and capable of avoiding an increase of the rotary torque, by suppressing the inner circumferential edge portion of the sealing member from entering into the raceway space.

A rolling bearing according to an aspect of the present disclosure includes:

an inner member having an inner race surface;

an outer member having an outer race surface which forms an annular raceway space between the outer race surface and the inner race surface;

a plurality of rolling elements arranged in the raceway space;

flexible annular sealing members which close openings at both ends in an axial direction of the raceway space respectively; and annular metal shield members provided at outer sides of the sealing members in the axial direction respectively, wherein each of the sealing members has an outer circumferential edge portion and an inner circumferential edge portion which contacts an outer surface of the inner member;

each of the sealing members is formed in a three-dimensional shape such that the sealing member in a natural state is convex inwardly in the axial direction between the outer circumferential edge portion and the inner circumferential edge portion, and the inner circumferential edge portion of the sealing member is elastically in surface contact with the outer surface of the inner member when the sealing member is fixed to the outer member;

each of the metal shield members is fixed to the outer member in a state that the outer circumferential edge portion of each sealing member is sandwiched between the metal shield member and the outer member; and each of the metal shield members covers at least part of each sealing member without contacting the outer surface of the inner member.

A rolling bearing according to an aspect of the present disclosure includes:

an outer member which has an annular shape;

an inner member which has an annular shape and which is arranged concentrically with the outer member;

a plurality of rolling elements arranged in a raceway space defined between the outer member and the inner member;

a pair of elastic sealing members each having an annular shape including an outer circumferential edge and an inner circumferential edge, the inner circumferential edge projecting to one side in an axial direction of the elastic sealing member in a state that no external force is applied to the elastic sealing member; and a pair of metal shield members each having an annular shape, wherein the outer circumferential edge of each of the pair of elastic sealing members is fitted to each end of the outer member in an axial direction of the outer member, each of the pair of metal shield members is fitted to the each end of the outer member on the opposite side of the outer member in relation to the elastic sealing member, and the inner circumferential edge of each elastic sealing member is in surface contact with the outer surface of the inner member in a state that the inner circumferential edge is biased toward the outer surface of the inner member.

A rolling bearing according to an aspect of the present disclosure includes:

an inner member having an inner race surface;

an outer member having an outer race surface which forms an annular raceway space between the outer race surface and the inner race surface;

a plurality of rolling elements arranged in the raceway space;

a flexible annular sealing member which closes an opening at an end in an axial direction of the raceway space; and an annular metal shield member provided at an outer side of the sealing member in the axial direction, wherein the sealing member has an outer circumferential edge portion and an inner circumferential edge portion which contacts an outer surface of the inner member;

the sealing member is formed in a three-dimensional shape such that the sealing member in a natural state is convex inwardly in the axial direction between the outer circumferential edge portion and the inner circumferential edge portion, and the inner circumferential edge portion of the sealing member is elastically in surface contact with the outer surface of the inner member when the sealing member is fixed to the outer member;

the metal shield member is fixed to the outer member in a state that the outer circumferential edge portion of the sealing member is sandwiched between the metal shield member and the outer member; and the metal shield member covers at least part of the sealing member without contacting the outer surface of the inner member.

BRIEF DESCRIPTION OF THE DRAWINGS

FIGS. 3A and 3B are enlarged views of part III of FIG. 1, wherein FIG. 3A depicts a state of an opening sealed with a sealing member while FIG. 3B depicts a state of the opening opened because the sealing member is deformed outward due to an internal pressure;

EMBODIMENTS

Referring to the accompanying drawings, an explanation will be made below on an embodiment in which the present disclosure is applied to a roller bearing.

[1] Configuration

Figure 1:
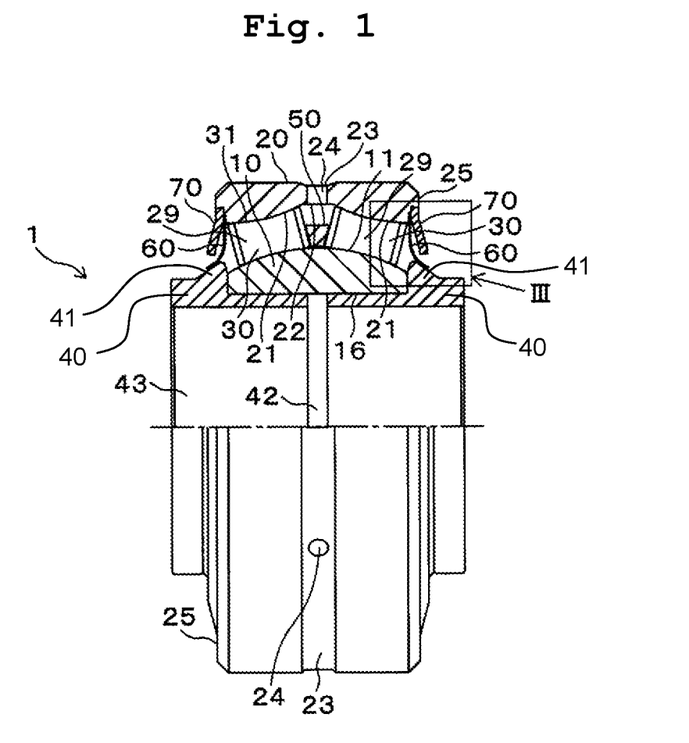
FIG. 1 is a partial cross-sectional side view of a roller bearing related to an embodiment of the present disclosure.
Figure 2:
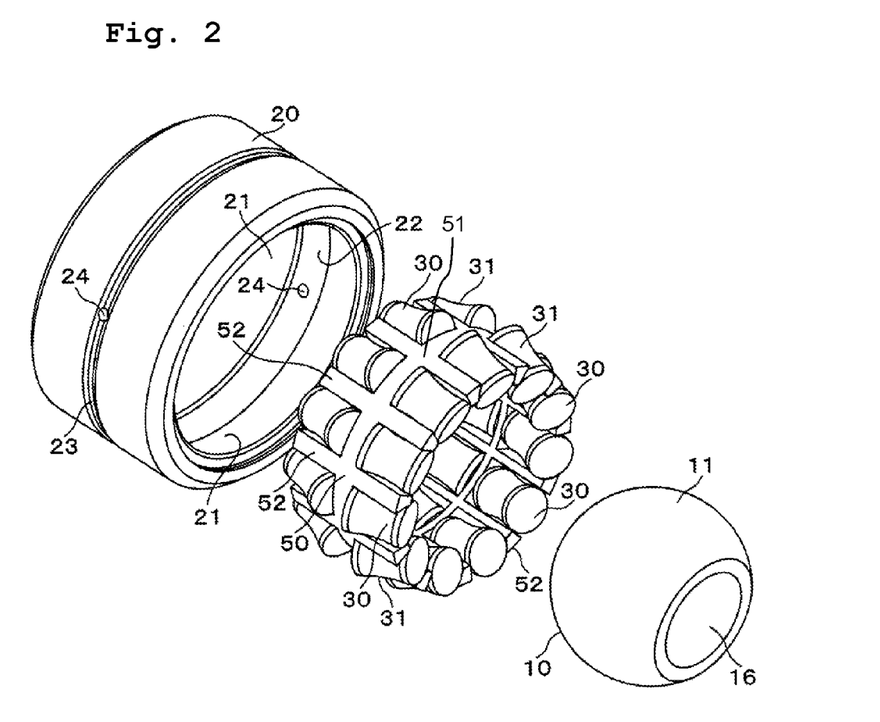
FIG. 2 is an exploded perspective view of the roller bearing.

FIG. 1 is a partial cross-sectional side view of a roller bearing 1 of self-aligning double-row type related to this embodiment of the present disclosure, while FIG. 2 is an exploded perspective view of the roller bearing 1. The roller bearing 1 includes a circular inner ring 10 and a circular outer ring 20 made of a metal such as stainless steel or the like, and a plurality of rollers (rolling elements) 30. In the following explanations, the axial direction refers to the axial directions of the inner ring 10 and the outer ring 20 while the circumferential direction refers to the circumferential directions of the inner ring 10 and the outer ring 20.

The inner ring 10 has an outer circumferential surface configured as an inner race surface 11 formed to have a convex spherical shape as a whole. As depicted in FIG. 1, a pair of collars (cylindrical members) 40 arranged on left and right sides of the inner ring 10 are fitted, from both sides in the axial direction, into a cylindrical hollow portion 16 of the inner ring 10 and fixed to the hollow portion 16 (the collars 40 are not depicted in FIG. 2). An interspace 42 is defined between the end surfaces of these collars 40 which are positioned on the inner side in the axial direction.

Figure 3A:
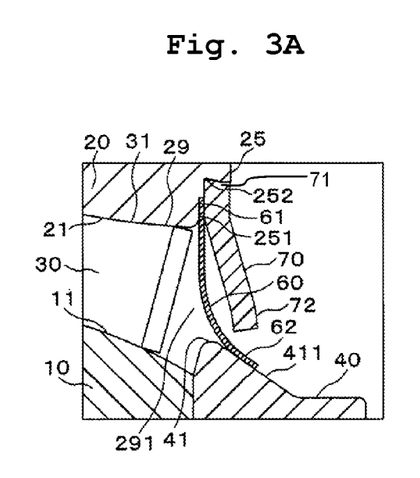

A flange portion 41 is formed on the outer circumferential surface of each of the collars 40 at the axially outer end of each collar 40. Each collar 40 is inserted into the hollow portion 16 until the flange portion 41 contacts the inner ring 10. The inner ring 10 is accommodated between the pair of flange portions 41 of the pair of the collars 40. As depicted in FIG. 3A, a tapered surface 411 is formed on the outer circumferential surface of each flange portion 41 at a portion located in the axially inner side (left side in FIG. 3A). The tapered surface 411 has a conical shape in which the diameter gradually decreases from the inner side to the outer side in the axial direction. In this embodiment, the inner member of the present disclosure is constructed from the inner ring 10 and the collars 40.

The outer member of the present disclosure is constructed from the outer ring 20. An inner circumferential groove 22 is formed at the center of the inner circumferential surface of the outer ring 20 in the axial direction. Further, convex spherical outer race surfaces 21 are formed symmetrically with respect to a plane orthogonal to the axial direction at the both sides of the inner circumferential groove 22. These outer race surfaces 21 have the same curvature as the inner race surface 11 of the inner ring 10 which faces the outer race surfaces 21. Between the left and right outer race surfaces 21 and the inner race surface 11 of the inner ring 10, it is formed raceway spaces 29 in which roller 30 is accommodated. In these raceway spaces 29, a plurality of rollers 30 are accommodated in a rollable manner.

An outer circumferential groove 23 is formed at the center of the outer circumferential surface of the outer ring 20 in the axial direction. In the outer ring 20, it is formed a plurality of through holes 24 in radial direction of the outer ring 20 such that the outer circumferential groove 23 and the inner circumferential groove 22 communicate with each other, at equal intervals in the circumferential direction. The through holes 24 are in communication with the raceway spaces 29 inside the roller bearing 1.

Each of the rollers 30 has an hourglass-shape formed such that the outline of the roller 30 in the longitudinal direction is concave. In other words, each of the rollers 30 has a substantially cylindrical shape with a recessed central portion such that a diameter of each roller 30 is larger at both ends and smaller at the center in the axial direction. The outer circumferential surface 31 has a curvature either equal to or slightly smaller than that of the race surfaces 11 and 21 mentioned above. By virtue of this, the outer circumferential surface 31 is in line contact condition with the above race surfaces 11 and 21 along the axial direction, and thus, the roller bearing 1 can perform self-aligning. As depicted in FIG. 2, the plurality of rollers 30 are retained by a retainer 50 and arrayed in the raceway spaces 29. The retainer 50 is configured to have a plurality of guides 52 extending from a circular frame 51 to both sides like comb-teeth. Each of the rollers 30 is provided between two adjacent guides 52. The plurality of rollers 30 are disposed in the raceway spaces 29 together with the retainer 50. In a state that the rollers 30 are accommodated in the raceway spaces 29, the rollers 30 are inclined with respect to the axial direction such that the outer circumferential surfaces 31 contact the inner race surface 11 of the inner ring 10 and one of the outer race surfaces 21 of the outer ring 20.

As depicted in FIG. 3A, annular opening 291 is formed at each end in the axial direction of the raceway spaces 29 (a space including two raceway spaces 29). The opening 291 is defined between the flange portion 41 of the collar 40 and end face 25 of the outer ring 20. The opening 291 is closed with an annular sealing member 60. Further, an annular metal shield member 70 is provided on the axially outer side of the sealing member 60.

The metal shield members 70 is made of a rigid metal and formed into a conical shape to project, as a whole, to one side in the axial direction. As depicted in FIG. 3A, a recess 251 is formed concentrically on the inner circumferential side of the end face 25 of the outer ring 20 (the recess 251 is formed to be concentric with the outer ring 20), so that a step portion 252 is formed in an outer circumferential side of the recess 251. The metal shield member 70 is fixed on the outer ring 20 by caulking or press fitting an outer circumferential edge portion 71 into the step portion 252 in a state that the projecting side faces the outer side in the axial direction. The metal shield member 70 does not completely close the opening and covers part of the sealing member 60 without contacting with the outer circumferential surface of the collar (the inner member) 40. Hence, there is an annular gap between the inner circumferential edge portion 72 of the metal shield member 70 and the flange portion 41 of the collar 40.

Figure 4:
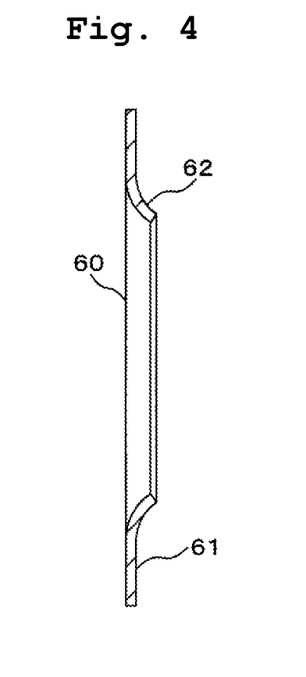
FIG. 4 is a cross-sectional view of the sealing member.

Each of the sealing members 60 is made of a flexible resin. In each of the sealing members 60, as depicted in FIG. 4, an outer circumferential edge portion 61 side from the center in the width direction is formed to be flat, and an inner circumferential edge portion 62 side from the center in the width direction is curved and projects to one side in the axial direction. As depicted in FIG. 4, the sealing member 60 is formed to be three-dimensional in an initial state in which the sealing member 60 has not been fitted to the outer ring 20 (that is, in a natural state without being subject to any force). Note that, the sealing members 60 are not depicted in FIG. 2.

Each of the sealing members 60 is fixed on the outer ring 20 with the outer circumferential edge portion 61 being sandwiched between the recess 251 of the outer ring 20 and the outer circumferential edge portion 71 of the metal shield member 70 fixed on the step portion 252 of the outer ring 20. In this fixed state, the sealing member 60 is curved to be convex toward the side of the raceway spaces 29, that is, toward the inner side between the outer circumferential edge portion 61 and the inner circumferential edge portion 62. Then, the inner circumferential edge portion 62 is elastically in surface contact with the tapered surface 411 of the flange portion 41 of the collar 40 from the outer side. The sealing performance of the sealing member 60 is improved because the inner circumferential edge portion 62 of the sealing member 60 is pressed against the tapered surface 411 due to the elastic deformation and the inner circumferential edge portion 62 is in surface contact with the tapered surface 411. Note that, the sealing member 60 is formed three-dimensionally in advance considering the fixed condition after the sealing member 60 is fitted to the outer ring 20. Therefore, the inner circumferential edge portion 62 of the sealing member 60 will not be crinkled (ruffled) in the fixed state.

The configuration of the roller bearing 1 related to this embodiment is as described above. For this roller bearing 1, an injection means such as a grease gun or the like is used to inject a lubricant such as grease or the like into the raceway spaces 29 from the through holes 24 of the outer ring 20.

According to the configuration of the roller bearing 1, the inside of each collar 40 (a radially inward hollow portion) is a shaft hole 43. For example, a shaft (not depicted) which rotates or oscillates is inserted into the shaft hole 43 and is fixed on the collar 40. On the other hand, the outer ring 20 is fixed on a housing or the like, for example. The movement of the shaft inserted into the shaft hole 43 is transmitted to the inner ring 10 via the collar 40, and thus when the shaft rotates, the inner ring 10 rotates together with the shaft. Rollers 30 roll following the rotation of the inner ring 10 so as to rotate the shaft smoothly. If a shaft center deviates from the axis of the roller bearing 1 due to some assembly error, vibration and/or the like, the inner race surface 11 of the inner ring 10 slides on the outer circumferential surfaces 31 of the rollers 30 following the deviation of the shaft from the axis of the roller bearing 1, and an alignment is performed. By this self-aligning effect, the shaft is, for example, allowed for bending.

[2] Function and Effect of the Sealing Members

Each of the sealing members 60 mentioned above is curved convexly to inside (toward the raceway spaces 29) between the outer circumferential edge portion 61 and the inner circumferential edge portion 62, and the inner circumferential edge portion 62 is in surface contact with the tapered surface 411 of the flange portion 41 of the collar 40, from the outer side (a side opposite to the side where the raceway spaces 29 are located) by an elastic force. That is, the inner circumferential edge portion 62 of the sealing member 60 is in surface contact with the tapered surface 411 pressed by the elastic force toward the tapered surface 411. By virtue of this, the sealing member 60 is less likely to curve inwardly and enter into the inside of the roller bearing 1 (that is, the raceway spaces 29), and constantly and stably contacts the tapered surface 411. Therefore, the sealing member 60 effectively prevents contaminants from entering into the inside of the roller bearing 1. Further, increasing of the rotary torque, which may otherwise occur when the sealing member 60 enters into the inside of the roller bearing 1, can be suppressed. The sealing member 60 has a length (its dimension in the width direction) sufficient to realize a surface contact with the collar 40. Hence, the sealing member 60 is easy to bend so as to assure the surface contact between the sealing member 60 and the collar 40.

As depicted in FIG. 4, the sealing member 60 is formed three-dimensionally in advance. Hence, it is possible for the inner circumferential edge portion 62 of the sealing member 60 to tightly contact the tapered surface 411 of the collar 40 without any gap. As a result, it is possible to increase the effect of preventing the entrance of contaminants. For example, if a sealing member is formed not three-dimensionally but in planar shape, then when the outer circumferential edge portion of the sealing member is fixed on the outer ring 20 and the inner circumferential edge portion of the sealing member is caused to be in surface contact with the tapered surface 411, the sealing member is deformed three-dimensionally. On this occasion, the inner circumferential edge portion is likely to crinkle and/or be ruffled. Hence, the sealing capability is reduced and the effect of preventing the entrance of contaminants is affected. Especially, if the sealing member is sufficiently wide such that the outer circumferential edge portion can be sandwiched between the metal shield member 70 and the outer ring 20 while the inner circumferential edge portion is in surface contact with the collar 40, then the sealing member is more likely to bend, and consequently, more likely to crinkle and/or be ruffled. However, if the sealing member 60 is formed three-dimensionally as in this embodiment, then the above problem may not arise.

Figure 3B:
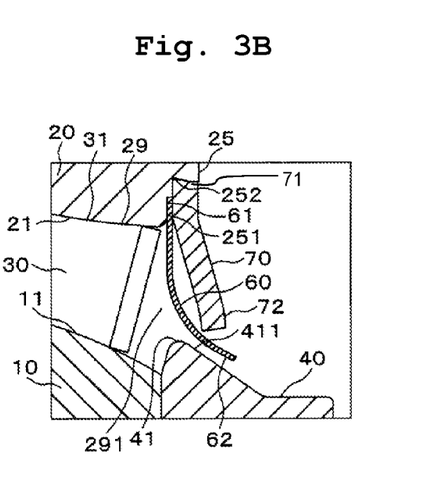

In the roller bearing 1, the lubricant is injected from the through holes 24 into the raceway spaces 29 to lubricate the sliding between the rollers 30 and each of the race surfaces 11 and 21. It is possible to inject the lubricant from the through holes 24 into the raceway spaces 29 to fill the inside of the roller bearing 1. Here, when the inside of the roller bearing 1 is filled with the lubricant, an inner pressure is produced. Then, as depicted in FIG. 3B, the inner circumferential edge portion 62 of the sealing member 60 pushed by that inner pressure is deformed elastically, and a portion of the inner circumferential edge portion 62 which is in surface contact with the tapered surface 411 is separated from the tapered surface 411 forming a gap. Then, the inner pressure produced by the lubricant is released from that gap and the excess of the lubricant leaks out through that gap. In this manner, it is possible to observe and recognize that the inside of the roller bearing 1 has been filled completely with the lubricant, based on the elastic deformation of the sealing member 60 and the leakage of the lubricant.

Further, as the inner circumferential edge portion 62 of the sealing member 60 is elastically deformed when the inside of the roller bearing 1 is filled with the lubricant such that the lubricant leaks out and the inner pressure is released, the problem due to the inner pressure where the metal shield member 70 comes off the outer ring 20 is prevented.

[3] Other Embodiments

Figure 5:
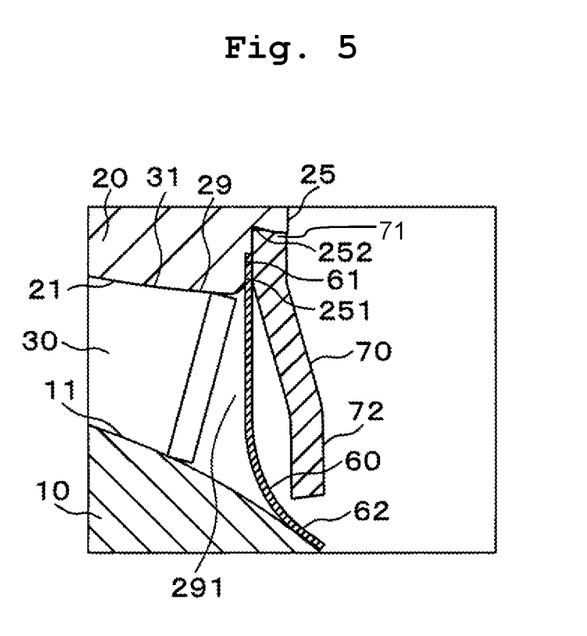
FIG. 5 is a vertical cross-sectional view of a roller bearing related to another embodiment.

The present disclosure is not limited to the above embodiment. For example, in the above embodiment, the inner member is constructed from the inner ring 10 and the collars 40. However, the inner member may be constructed from the inner ring 10 alone as depicted in FIG. 5. In this case, the inner circumferential edge portions 62 of the sealing members 60 are elastically in surface contact with the outer surface of the inner ring 10 from the outer side (outside of the raceway spaces 29). Further, the sealing members 60 in the above embodiment have such a shape as curved convexly inward. However, the sealing members 60 may have a shape being bent convexly to inside, for example, instead of being curved. Further, the present disclosure is not limited to roller bearings but is applicable to various rolling bearings such as ball bearings, needle bearings, and the like. Further, it is not indispensable to close openings at both ends of the raceway spaces 29 by using two sealing members 60 and two metallic shield members 70. In some embodiments, a roller bearing may have one sealing member 60 and one metallic shield member 70 provided at one end of the raceway space 29 in the axial direction. In those embodiments, for example, the other end of the raceway space 29 may be closed with a conventional sealing member.

Each of the sealing members of the above embodiments is formed to be, in its natural state, convex inwardly in the axial direction, between the outer circumferential edge portion and the inner circumferential edge portion, and in a state in which the sealing member is fitted to the outer member, the inner circumferential edge portion is elastically in surface contact with the outer surface of the inner member. In this case, the sealing members may be curved to be convex inwardly in the axial direction, between the outer circumferential edge portions and the inner circumferential edge portions. By virtue of this, the sealing members are less likely to enter into the roller bearing (into the raceway space), and constantly and stably contact the inner member. Therefore, contaminants are effectively prevented from entering into the rolling bearing (into the raceway space). Further, the increase of rotational torque caused by the sealing member entering into the rolling bearing is suppressed.

According to the above embodiments, each of the sealing members is formed three-dimensionally to be, in its natural state, convex inwardly in the axial direction between the outer circumferential edge portion and the inner circumferential edge portion. With such a configuration, it is possible for the inner circumferential edge portions of the sealing members to contact tightly to the outer surface of the inner member without any gap. Hence, the effect of preventing the entrance of contaminants is improved. Conversely, if each of the sealing members is not formed three-dimensionally but in planar shape, then when the outer circumferential edge portion is fixed on the outer member and the inner circumferential edge portion is caused to elastically be in surface contact with the outer surface of the inner member from the outside, the sealing member is deformed three-dimensionally and, the inner circumferential edge portion is likely to crinkle and/or be ruffled. Hence, the sealing capability of sealing member is decreased and the effect of preventing the entrance of contaminants is affected. However, if each sealing member itself is formed three-dimensionally, then such problem may not arise. Further, the above embodiments include another aspect wherein the inner race surface is a spherical surface, and each of the rolling elements is a roller having a contact surface to contact linearly, i.e., in line contact condition with the spherical surface and thus it is capable of self-aligning. In this case, because the sealing members are also formed three-dimensionally, even though the inner race surface is spherical, it is still possible for the inner circumferential edge portions to be in surface contact with the outer surface of the inner member without any gap.

Further, the above embodiments include still another aspect wherein a through hole which is used to inject a lubricant into the raceway space is provided in the inner member or the outer member. According to this embodiment, it is possible to inject the lubricant such as grease or the like from the through hole to fill the inside of the rolling bearing. Here, if the inside of the rolling bearing is filled with the lubricant, then an inner pressure is produced. Thus, the inner circumferential edge portions of the sealing members are pushed by that inner pressure to cause an elastic deformation such that a portion of the inner circumferential edge portion in surface contact with the outer surface of the inner member is separated from the inner member to form an gap. Then, the inner pressure produced by the lubricant escapes from that gap and the excess of the lubricant leaks out. It is possible to observe and recognize that the inside of the rolling bearing has been filled completely with the lubricant, based on the leakage of the lubricant. Further, during the injection of the lubricant, the inner circumferential edge portions of the sealing members are deformed such that the lubricant leaks out and the inner pressure produced by the lubricant is released. Thereby, the problem due to the inner pressure where the metal shield members come off the outer member is prevented.

Further, the above embodiments include still another aspect wherein the inner member includes an inner ring having the inner race surface, and a cylindrical member fitted into a hollow portion of the inner ring, and the inner circumferential edge portion of each of the sealing members is in surface contact with at least one of the inner ring and the cylindrical member.

According to the above embodiments, there is provided a rolling bearing which is capable of effectively preventing contaminants from entering into the raceway space and which is capable of avoiding the increase of rotational torque by suppressing the sealing members from entering into the raceway space.

What is claimed is:

1. A rolling bearing comprising:
   an inner member having an inner race surface;
   an outer member having an outer race surface which forms an annular raceway space between the outer race surface and the inner race surface;
   a plurality of rolling elements arranged in the raceway space;
   flexible annular sealing members which close openings at both ends in an axial direction of the raceway space respectively; and
   annular metal shield members provided at outer sides of the sealing members in the axial direction respectively,
   wherein each of the sealing members has an outer circumferential edge portion and an inner circumferential edge portion which contacts an outer surface of the inner member;

each of the sealing members is formed in a three-dimensional shape such that the sealing member in a natural state is convex inwardly in the axial direction between the outer circumferential edge portion and the inner circumferential edge portion, and the inner circumferential edge portion of the sealing member is elastically in surface contact with the outer surface of the inner member when the sealing member is fixed to the outer member;

each of the metal shield members is fixed to the outer member in a state that the outer circumferential edge portion of each sealing member is sandwiched between the metal shield member and the outer member; and each of the metal shield members covers at least part of each sealing member without contacting the at least part of each sealing member and without contacting the outer surface of the inner member.

2. The rolling bearing according to claim 1, wherein each sealing member is curved between the outer circumferential edge portion and the inner circumferential edge portion.

3. The rolling bearing according to claim 1, wherein the inner race surface is a spherical surface, each of the rolling elements is a roller having a contact surface which contacts linearly with the spherical surface, and the rolling bearing is capable of self-aligning.

4. The rolling bearing according to claim 1, wherein a through hole which is used to inject a lubricant into the raceway space is provided in the inner member or the outer member.

5. The rolling bearing according to claim 1, wherein the inner member includes an inner ring having the inner race surface, and a cylindrical member fitted into a hollow portion of the inner ring; and the inner circumferential edge portion of each of the sealing members is in surface contact with at least one of the inner ring and the cylindrical member.

6. A rolling bearing comprising:

an outer member which has an annular shape;

an inner member which has an annular shape and which is arranged concentrically with the outer member;

a plurality of rolling elements arranged in a raceway space defined between the outer member and the inner member;

a pair of elastic sealing members each having an annular shape including an outer circumferential edge and an inner circumferential edge, the inner circumferential edge projecting to one side in an axial direction of the elastic sealing member in a state that no external force is applied to the elastic sealing member; and a pair of metal shield members each having an annular shape, wherein the outer circumferential edge of each of the pair of elastic sealing members is fitted to each end of the outer member in an axial direction of the outer member, each of the pair of metal shield members is fitted to the each end of the outer member on the opposite side of the outer member in relation to the elastic sealing member, the inner circumferential edge of each elastic sealing member is in surface contact with the outer surface of the inner member in a state that the inner circumferential edge is biased toward the outer surface of the inner member, and each of the pair of metal shield members covers at least part of the pair of elastic sealing members without contacting the at least part of each of the pair of elastic sealing members.

7. The rolling bearing according to claim 6, wherein each of the pair of elastic sealing members is curved to project to one side in the axial direction of the elastic sealing member.

8. The rolling bearing according to claim 6, wherein each of the plurality of rolling elements has a contact surface which contacts linearly with the outer circumferential surface of the inner member and an inner circumferential surface of the outer member.

9. The rolling bearing according to claim 6, wherein a through hole which is used to inject a lubricant into the raceway space is provided in the inner member or the outer member.

10. The rolling bearing according to claim 6, wherein the inner member includes an inner ring in contact with the plurality of rolling elements, and a cylindrical member fitted into a hollow portion of the inner ring; and the inner circumferential edges of the pair of elastic sealing members are in surface contact with at least one of the inner ring and the cylindrical member.

11. A rolling bearing comprising:

an inner member having an inner race surface;

an outer member having an outer race surface which forms an annular raceway space between the outer race surface and the inner race surface;

a plurality of rolling elements arranged in the raceway space;

a flexible annular sealing member which closes an opening at an end in an axial direction of the raceway space; and an annular metal shield member provided at an outer side of the sealing member in the axial direction, wherein the sealing member has an outer circumferential edge portion and an inner circumferential edge portion which contacts an outer surface of the inner member;

the sealing member is formed in a three-dimensional shape such that the sealing member in a natural state is convex inwardly in the axial direction between the outer circumferential edge portion and the inner circumferential edge portion, and the inner circumferential edge portion of the sealing member is elastically in surface contact with the outer surface of the inner member when the sealing member is fixed to the outer member;

the metal shield member is fixed to the outer member in a state that the outer circumferential edge portion of the sealing member is sandwiched between the metal shield member and the outer member; and the metal shield member covers at least part of the sealing member without contacting the at least part of the sealing member and without contacting the outer surface of the inner member.

12. The rolling bearing according to claim 11, wherein the sealing member is curved between the outer circumferential edge portion and the inner circumferential edge portion.

13. The rolling bearing according to claim 11, wherein the inner race surface is a spherical surface, each of the rolling elements is a roller having a contact surface which contacts linearly with the spherical surface, and the rolling bearing is capable of self-aligning.

14. The rolling bearing according to claim 11, wherein a through hole which is used to inject a lubricant into the raceway space is provided in the inner member or the outer member.

15. The rolling bearing according to claim 11, wherein the inner member includes an inner ring having the inner race surface, and a cylindrical member fitted into a hollow portion of the inner ring; and the inner circumferential edge portion of the sealing member is in surface contact with at least one of the inner ring and the cylindrical member.

* * * * *